June 5, 1973  H. S. HORN  3,737,360

APPLICATOR-DISPENSER FOR APPLYING SELF-ADHESIVE MATERIALS

Filed Aug. 19, 1971  2 Sheets-Sheet 1

INVENTOR.
HARVEY S. HORN
BY
ATTORNEY

June 5, 1973   H. S. HORN   3,737,360
APPLICATOR-DISPENSER FOR APPLYING SELF-ADHESIVE MATERIALS
Filed Aug. 19, 1971   2 Sheets-Sheet 2

INVENTOR.
HARVEY S. HORN
BY
ATTORNEY

United States Patent Office 3,737,360
Patented June 5, 1973

3,737,360
APPLICATOR-DISPENSER FOR APPLYING
SELF-ADHESIVE MATERIALS
Harvey S. Horn, Bronx, N.Y., assignor to United
Merchants and Manufacturers, Inc., New York, N.Y.
Filed Aug. 19, 1971, Ser. No. 173,167
Int. Cl. B32b 31/20
U.S. Cl. 156—577    4 Claims

ABSTRACT OF THE DISCLOSURE

A portable device adapted to be operated by hand and in the nature of a dispenser or applicator for applying self-adhesive materials, especially plastic self-adhesives, to a flat surface from a source of supply wherein the self-adhesive plastic material is characterized by a removable paper backing or the like, which is to be stripped away from the self-adhesive plastic at the time of application of such plastic to the surface to be covered thereby.

BACKGROUND OF THE INVENTION

Two currently widely known products are CON-TACT® plastic and KWIK KOVER® plastic. Both of these products are "do it yourself, package" articles useful to the housewife or householder in covering virtually any clean, smooth surface that is to be decorated or reinforced by plastic self-adhesive covering material. Both are essentially the same in structure and function: comprising an article of commerce that has been found very useful since its introduction to the market place in or about 1954. The article includes self-adhesive decorative surface covering plastic material in sheet form for walls, shelves, furniture, and home furnishings, and the like, and comprises, typically an opaque or transparent printed plastic film bearing a decorative pattern on one side and coated with a pressure sensitive permanent adhesive on its other side. A temporary paper backing covers the adhesive and is adapted subsequently to be stripped from the adhesive coated plastic material.

For a more particularized discussion and description of the self-adhesive plastic products sold under the trade marks CON-TACT® and KWIK KOVER®, of their structure and suitable methods for their manufacture, reference may be had to the patent to Silman U.S. No. 3,130,113, granted Apr. 21, 1964, the contents of which are hereby incorporated herein by reference.

It has heretofore been proposed to provide an applicator-dispenser for such products as CON-TACT® and KWIK KOVER® plastics (described above) by constructing and using for that function a substantially rigid circular tube provided with a longitudinal slot extending the full length of the tube from one end thereof to the other, the edges of such slot having a substantially rigid inflexible semi-circular profile: the arrangement being such that the tube may be used as a carrier as well as an applicator for the plastic sheet material in the form of a roll. When the housewife desires to apply a portion of the rolled-up sheet material to any surface that is to be covered, the tube carrying such roll is brought into contact with the surface that is to be covered, the leading edge of the plastic material is pulled out of the tube by hand and pulled apart, which is to say, the strippable paper backing or more particularly the end portion thereof is taken out of contact with the adhesive coated underside of the plastic and pulled in one direction, away from and out of contact with the surface that is to be covered. Simultaneously, the adhesive coated plastic component, now separated from and out of contact with the paper backing, is pulled or moved in the opposite direction and put into contact with the surface that is to be covered. Having thus established working contact between the plastic and the surface that is being covered, the operation proceeds by bodily moving the applicator over and along the remaining areas of the surface being covered and as this operation proceeds the remaining portions of the strippable paper backing are similarly removed from and out of contact with both the surface and self-adhesive plastic.

In the operation thus described, as will be understood, the plastic component is passed under one edge, which we will call for convenience the leading edge of the longitudinal slot in the tube carrier, and as the tube is pressed down upon the surface to be covered and moved there-along by the operator, pressure is applied by such leading edge of the slot member to the mating interfaces of the plastic sheet material and the surface which is being covered thereby.

As previously indicated, in the prior art structure the leading edge or pressure applying edge of such applicators is made of substantially rigid, inflexible material, purportedly to prevent or at least eliminate surface imperfections resulting from the formulation of small pockets or blisters of entrapped air at the interface of the two bonding surfaces namely, the adhesive coated undersurface of the plastic material and the exposed uppersurface that is being covered. Moreover, it was intended and expected by fashioning such leading or pressure edges into an inflexible and unyielding form that it would thereby be possible to prevent the formulation of unsightly creases as well as air bubbles or blisters in the decorative surface material during application thereof as by means of the conventional dispensers thus characterized in that such are provided with a pressure or a leading edge of inflexible and undeformable or substantially rigid construction or design.

In fact, however, these conventional applicator pressure edges did not function satisfactorily as intended perhaps primarily because the rigidity or undeformability thereof was such as to prevent the requisite mating between the plastic and the surfaces to be covered especially such as are uneven or undulating in profile. Moreover, in cases where the surfaces being covered are provided with raised portions the substantially rigid and undeformable and inflexible leading edges of the prior art frequently resulted in tearing the CON-TACT®, KWIK KOVER® and other self-adhesive plastic films in the process of applying the same to the decorative surface.

SUMMARY OF INVENTION

It is, therefore, one object of the present invention to provide an applicator and dispenser which is adapted to quickly and efficiently enable a housewife or other person to bond self-adhesive decorative surface-covering materials to desired surfaces and obviate the disadvantages enumerated above of the prior manual application of such materials.

It is a further object of this invention to provide a portable hand operated dispensing and applicating construction suitable for the efficient removal of backing layers or liners, with simultaneous bonding of the self-adhesive decorator surface-covering materials to desired substrates without encountering problems in forming creases in the surface-covering material, and without the formation of small pockets of entrapped air or blisters at the interface of the two bonding surfaces. A still further object of the invention resides in the provision of an elongated tubular construction from which the self-adhesive decorative surface-covering material may be efficiently dispensed in applying such materials to flat surfaces without encountering the problems heretofore involved in hand application.

In particular, a prime object of the present invention is to substitute a flexible, deformable, generally convex, large area leading edge in dispensing units of the character described, for the conventional relatively rigid or inflexible, undeformable and small area leading edge, thereby eliminating or at least reducing the undesirable creasing and tearing of the self-adhesive plastic decorative material which in the past has occurred when applying such material to a wall, table top, or the like.

BRIEF DESCRIPTION OF DRAWINGS

With the above and other objects in view, as will be apparent, the present invention consists in the construction, combination, and arrangement of parts and/or steps, all as hereinafter more fully described, claimed and illustrated in the accompanying drawings wherein:

DESCRIPTION OF THE PREFERRED EMBODIMENT

According to this invention, there is provided a portable, manually operated dispenser and applicator construction which comprises an elongated, substantially rigid tube member provided with a longitudinal slot therein extending the entire length of the tube, and further provided with at least one end plate which is removable to provide means of inserting a roll of the decorative surface-covering material therein for use, the said tube member also being provided with a leading pressure edge in the form of a wide area, semi-circular, flexible, deformable, substantially concave pressure member, constructed and arranged to prevent or minimize the formulation of creases and the occurrence of tears during the operation of dispensing and applying the self-adhesive plastic material from the applicator to the surface that is to be decoratively or otherwise covered.

Figure 1:
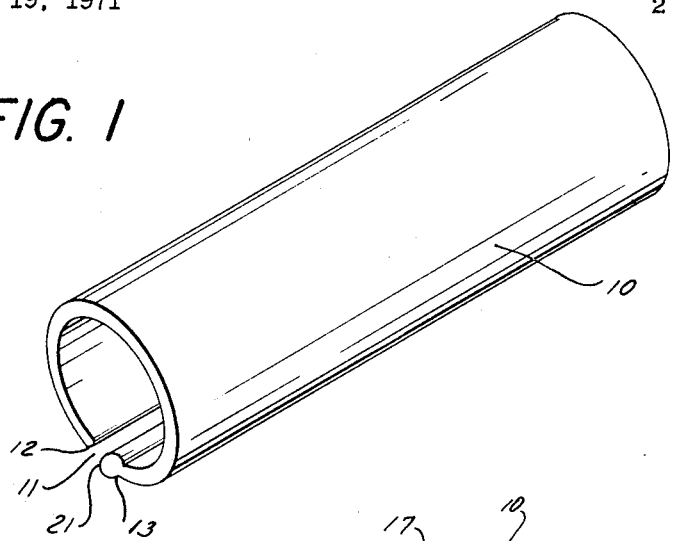
FIG. 1 comprises a perspective view of one embodiment of the present invention comprising a rigid circular tube-like structure constructed and arranged to function as a carrier-dispenser for the self-adhesive plastic material including a longitudinal gap or slot from which the plastic material may be unwound from the roll.
Figure 2:
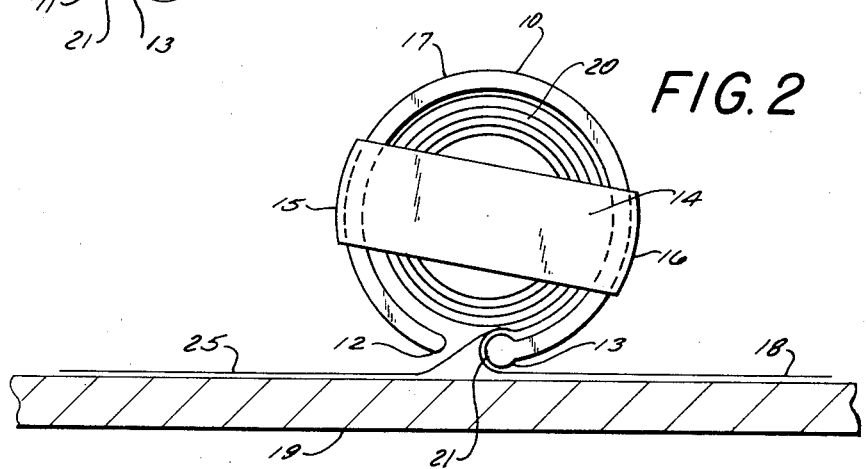
FIG. 2 is an end elevation of the plastic tube loaded with a roll of the self-adhesive plastic material and illustrating the means by which the strippable paper backing is separated from the adhesive coated plastic component as the latter is laid down upon the surface to be decorated and otherwise illustrating how the applicator functions.
Figure 3:
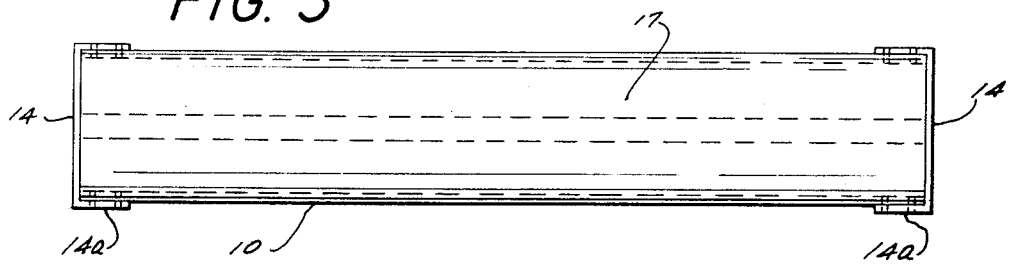
FIG. 3 is a side view of the elongated tube structure including stop means provided at either end thereof to retain the roll of plastic material in the dispenser after the material is loaded therein.
Figure 4:
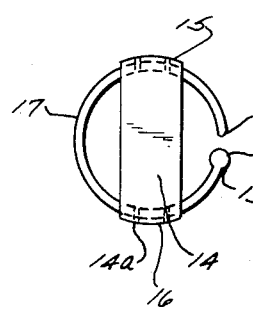
FIG. 4 is an end elevation of the applicator-dispenser illustrating the wide area semi-circular flexible and deformable convex leading edge by means of which the creasing and tearing of the prior art constructions are avoided or minimized.

Referring now again to the several figures illustrating the invention the present device as seen in FIG. 1 and FIG. 2 may comprise a lightweight substantially rigid smooth surfaced circular tube 10, which may be made of plastic, metal, paper, rubber, fiber, wood or other such material. The tube 10, as noted in FIG. 1, may be provided with a longitudinal gap or slot 11 running from one end to the other of the circular tube 10. The two edges 12 and 13 of the slot 11 are characterized by a semi-circular convex shape; and attached to both open ends of the tube 10 are stop members or retainers 14 which may function as end plates and which may be made of sections of elastic tape material suitably fixed as by staples or eyelets 14a to opposed sides 15, 16 of the exterior surface 17 of the tube 10, as illustrated in FIGS. 3 and 4.

A variety of construction materials are suitable for fabrication of the tube 10. The main classes are as follows: plastic (thermoplastic, thermosetting and reinforced), fiber, and wood. Specific dimensions for length, inside diameter, width of slot, and thickness of the tube can vary, depending on the over-all width, length, and thickness of the self-adhesive covering material that is to be applied.

Generally, the length of the tube should be approximately one-eighth of an inch longer than the width of the self-adhesive material, and the minimum inside diameter should be determined from the length of the self-adhesive goods that will be rolled up and charged into the tube. For example, 36 linear feet of CON-TACT® plastic, in rolled-up form, can fit into a slotted tube having an inside diameter of 2¼ inches.

As for the wall thickness of the tube, this dimension should be established on the basis of design and physical properties of the construction material. It is highly desirable to have the tube 10 designed so that the leading edge 13 of the slot will bow, deform, and flex, or spread over a wide area whilst the plastic material 18 is being drawn down and removed from the carrier-applicator tube 10 and applied to the surface or substrate 19. This is one of the chief means for preventing tears and creases in the plastic 18 as it is put down and bonded to the substrate 19: namely, the wide area flexible, deformable and substantially semi-circular convex leading edge member 13 which functions as a pressure member for facilitating and promoting the interface relationship or bond between the exposed adhesive coated undersurface of the plastic 18 and the uppersurface of the substrate member 19.

Moreover, it is preferred that the inside surface of the tube 10 and the convex deformable leading edge member 13 should be constructed with a material or finished with a coating that is smooth and manifests a low coefficient of friction against the outside surface of the self-adhesive covering material 18.

Figure 5:
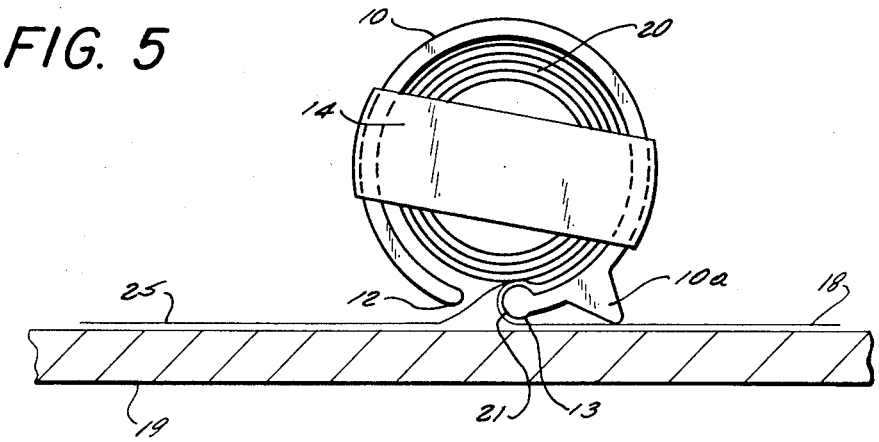
FIG. 5 is another end elevation of the tube applicator device again illustrating the method by which the applicator functions, including a partial sectional representation of the surface being decorated, and also illustrating a modification of the present invention in the nature of a stabilizer leg for providing another and cumulative pressure point of contact between the applicator and the outer side of the self-adhesive decorative material as it is being applied.

Preferably each of the applicator tube 10 is also provided with a retainer or an end plate 14 to permit charging and discharging of the wound-up roll 20 of self-adhesive surface covering material carried within the applicator tube 10 where said roll 20 is confined in proper position during the application or dispensing operation as illustrated in FIGS. 2 and 5 of the drawings hereof.

The modified embodiment of the invention illustrated in FIG. 5 comprises a structural addition in the form of a projection, protuberance, or extension 10a which functions as a stabilizing leg added onto or made integral with the outer surface of the circular tube 10 thereby providing an additional point of pressure contact with and upon the self-adhesive material 18 as it is being bonded to the substrate 19. Thus the stabilizer 10a and the wide area leading edge member 13 are constructed and arranged to co-act in the cumulative application of pressure to spaced portions along the length of the surface covering material 18 being laid down and bonded to the substrate 19.

In addition to functioning as a cumulative pressure member, the fixed leg 10a, which unlike its co-acting pressure member 21 should be substantially rigid in design, may serve a double function, namely, as a guide-on to insure that the surface covering material is properly applied in a straight line rather than crookedly or obliquely. In operation, a leader of the plastic covering material about 6 inches long is withdrawn from the applicator tube, and the same amount of the release paper is folded back from the plastic: the leader also being reversed upon itself so as to allow the leg 10a to be lined up straight against the surface to be covered. With that straight line established, the operator takes hold of the 6 inch leader and uses the position of the leg 10a as a guide-on to align and place the tube edge and one side of the exposed leader against the surface to be covered.

Figure 6:
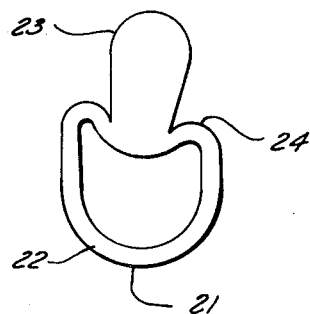
FIG. 6 is an end elevation of the present improved wide area flexible and deformable semi-circular convex pressure edge which is distinguishable from conventional pressure edges in the particulars indicated above and as will be more fully disclosed hereinafter.

In FIG. 6 is shown an end elevation of the present improvements comprising a leading pressure edge member 21 having a bulbous end portion 22, substantially semi-circular and convex in profile, the outer periphery of which constitutes the working surface whereby pressures means are applied to secure or bond the self-adhesive material 18 to the substrate 19, with or without the auxiliary pressure member 10a. The pressure member 21 is further characterized by a reduced or constricted neck portion 23 adapted to be inserted or mounted and fixed within a recess along the full length of the longitudinal slot member 11. Such recess or groove may be obtained by bifurcating the end portion of the leading edge 13. As will be understood the arrangement is such as to permit the insertion, as by a tongue and groove connection, of the reduced neck portion 23 within the bifurcated adjacent ends of the pressure member 13. The semi-circular, convex, deformable and compressible wide area leading edge 21 may be made of a low density or low molecular weight polyethylene material and fabricated according to the shape and design indicated in FIG. 6 by conventional extrusion apparatus.

As will also be apparent from FIG. 6 the wide area convex flexible and deformable pressure edge insert member 21 is further characterized in that except for its reduced neck portion 23 it comprises a hollow body portion defined by the compressible semi-circular outer sides 22 and the shoulders 24, the latter being so arranged and constructed as to be in intimate contact with and fastened to the bifurcated end portions of the leading edge member 13. Thus the pressure member 21 constitutes a deformable and compressible device made up of a reduced neck portion by which the member 21 is secured to the member 13 and a wide area working surface portion 22 which, being hollow rather than solid, permits the member 21 to conform to the wall surface that is being covered to be deflected and to be flattened out or compressed, and to expose a larger flat portion of its working outer surface to press against the plastic film material being applied to the wall surface. Since the convex pressure edge 21 which is to be inserted within the spaced end walls of the leading edge member 13 is fabricated from a low weight polyethylene, its flexibility and compressibility are readily obtained according to the usual known techniques of extrusion.

What is to be emphasized, however, with respect to the design, form and shape of the insertable pressure member 21 is that because of its semi-circular wide area design and partially hollow form, it is adapted to conform readily to the wall surface, to deflect and to flatten as the plastic material 18 is being unrolled from the tube 10 and bonded to the substrate 19.

With regard to the trailing edge member 12 of the tube 10 which functions to control the stripping of the paper backing or release paper 25 from the roll 20 of plastic the edge portion thereof preferably is made integral with the longitudinal edge defined by the other side of the longitudinal gap 11. As indicated in FIG. 2 in operation pressure is applied by the convex area 21 which is pivoted against the substrate 19 and plastic 18 so as to render the trailing edge member 12 slightly elevated from and out of contact with the substrate 19 as the paper backing 25 is simultaneously separated from the plastic 18. In other words, by reason of the pivoting action noted above, sufficient clearance is provided between the trailing edge member 12 and the unwinding release paper 25 so as to allow the stripped release paper 25 to be removed from the area of application of the plastic 18 to the substrate 19 without in any way interfering therewith.

Figure 7:
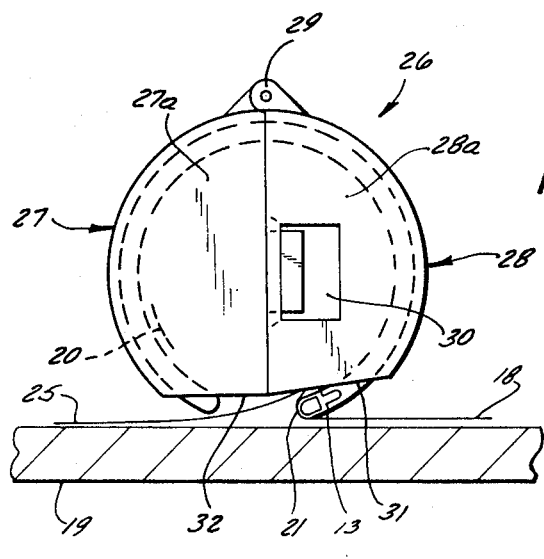
FIG. 7 is an end elevation of a modified form of the present applicator-dispenser wherein the device is bisected longitudinally: the parts being hinged together at the top for easier loading.

The applicator-dispenser 26 of FIG. 7 is a modified embodiment of the invention characterized in that the device is bisected longitudinally along the top and sides and thereby divided into two substantially equal parts 27 and 28 which are hinged together as at 29 for greater loading facility and for simplification in fabricating. A recessed keeper 30 is constructed and arranged to releasably fasten the two halves 27, 28 in the closed position when the applicator-dispenser is loaded with a roll of the surface covering material 20.

As will also be apparent, the end plates 27a, 28a may be bias cut at the bottom to facilitate the dispensing operation, the obliquely disposed bottom edge 31 of the right half segment 28 lying in a plane above the plane of the corresponding bottom edge 32 of the left half member 27.

To insure satisfactory operation and performance of the present applicator improvements in laying down the self-adsesive surface covering material to the substrate the following suggestions are deemed appropriate.

(1) Measure and cut the required length of self-adhesive surface covering material (with backing paper on).

(2) With the decorative side facing "out," wind the cut piece into a roll slightly smaller than the inside diameter of the tube. Make sure that the end of the rolled-up material is even and square.

(3) Open one of the end-plates, and insert the workpiece roll into the hollow tube, then replace end-plate.

(4) From the slot in the applicator, withdraw approximately a 6 inch long leader of the self-adhesive material, then strip and fold back the release paper to the slotted edge. Do not cut off or tear the release paper.

(5) Gently and accurately align the top edge and one side of the stripped leader, with self-adhesive side "down," against the flat surface to be bonded.

(6) With your hand, press down firmly and smooth the self-adhesive covering material from center out to edges, to eliminate air bubbles and creases.

(7) With applicator slot facing "down," grip each side of the tube with your hands, and apply a moderate pressure against the leading edge, and simultaneously raise slightly the trailing edge of the slot, as shown in drawing FIG. 2, by pivoting the tube on the leading edge to permit easy passage of the unwinding release paper.

(8) Apply a slight tug to the leader of the stripped release paper in order to be sure that the release paper is not jammed in the slot, but is free and preceding the trailing edge.

(9) Finally, apply a slow, even pull on the applicator in the direction of the surface to be covered. The release paper will discharge from the trailing edge of the slot at the same rate that the self-adhesive surface covering material is being laminated to the surface of the substrate.

Summarizing, the present invention comprises particularly an insertable convex wide area edge for an applicator-dispenser device of the character described above: said edge being characterized by excellent slip, compression, deforming and flexing properties, its design and form being such as to provide a larger area of surface contact thereof with the outer side of the plastic being applied, and such as to apply thereto a pressure communicated from the plastic to the underlying substrate, above and beyond such pressure as would be obtainable by present day rigid and undeformable pressure edges embodied in conventional dispenser-applicators.

As will be further understood, if it is desired to use the leg and stabilizer 10a as a pressure member only, then preferably the length thereof will span the full width of the tube 10 in order to function most efficiently in supplementing the pressure applied by the leading edge 21 to the surface covering material 18 as it is laid down or affixed to the surface. An the other hand, if desired, the bi-functional aspect of the leg 10a may be converted into a structure primarily or solely useful as the "guide-on" member for laying down the self-adhesive material 18 and in that case the length of the guide-on 10a may be no more than several inches such being sufficient to establish the proper alignment of the edge of the plastic in its application to the surface.

What is claimed is:

1. A dispenser-applicator device for a roll of surface covering sheet material in the nature of a self-adhesive plastic and a strippable paper backing adherent thereto, comprising a substantially rigid tube member for receiving the material, said tube member being provided with an elongated longitudinal slot for manually unwinding and dispensing a predetermined length of the material, said longitudinal slot being provided with a substantially flexible, deformable, wide area, hollow, convex profile, leading edge member for evenly pressing against the top side of the material being dispensed and applied to the surface to be covered thereby, said slot being further provided with a substantially rigid, undeformable, trailing edge member for simultaneously releasing the strippable paper backing from the material as it is dispensed from the tube and applied as a surface covering material, said device being further characterized in that the leading edge pressure member comprises a relatively large bulbous protuberance attached to and extending from a relatively small constricted neck portion constructed and arranged within a bifurcated segment of said tube member.

2. A dispenser-applicator device for a roll of surface covering sheet material in the nature of a self-adhesive plastic and a strippable paper backing adherent thereto, comprising a substantially rigid tube member for receiving the material, said tube member being provided with an elongated longitudinal slot for manually unwinding and dispensing a predetermined length of the material, said longitudinal slot being provided with a substantially flexible, deformable, wide area, hollow, convex profile, leading edge member for evenly pressing against the top side of the material being dispensed and applied to the surface to be covered thereby, said slot being further provided with a substantially rigid, undeformable, trailing edge member for simultaneously releasing the strippable paper backing from the material as it is dispensed from the tube and applied as a surface covering material, said device being further characterized in that said tube member is provided with at least one removable retainer end plate.

3. A dispenser-applicator device for a roll of surface covering sheet material in the nature of a self-adhesive plastic and a strippable paper backing adherent thereto, comprising a substantially rigid tube member for receiving the material, said tube member being provided with an elongated longitudinal slot for manually unwinding and dispensing a predetermined length of the material, said longitudinal slot being provided with a substantially flexible, deformable, wide area, hollow, convex profile, leading edge member for evenly pressing against the top side of the material being dispensed and applied to the surface to be covered thereby, said slot being further provided with a substantially rigid, undeformable, trailing edge member for simultaneously releasing the strippable paper backing from the material as it is dispensed from the tube and applied as a surface covering material, said device being further characterized in that said tube member is provided with an auxiliary pressure member in the form of a stabilizing leg projecting from said tube member adjacent its leading edge member and constructed and arranged to co-act simultaneously therewith in pressing against the top side of the material being dispensed and applied to the surface to be covered thereby.

4. A dispenser-applicator device for a roll of surface covering sheet material in the nature of a self-adhesive plastic and a strippable paper backing adherent thereto, comprising a substantially rigid tube member for receiving the material, said tube member being provided with an elongated longitudinal slot for manually unwinding and dispensing a predetermined length of the material, said longitudinal slot being provided with a substantially flexible, deformable, wide area, hollow, convex profile, leading edge member for evenly pressing against the top side of the material being dispensed and applied to the surface to be covered thereby, said slot being further provided with a substantially rigid, undeformable, trailing edge member for simultaneously releasing the strippable paper backing from the material as it is dispensed from the tube and applied as a surface covering material, said device being further characterized in that said tube member is bisected longitudinally, the bisected parts being hinged together at the top for easier loading.

References Cited

UNITED STATES PATENTS

| | | | |
|---|---|---|---|
| 3,586,587 | 6/1971 | Boyce | 156—577 X |
| 2,569,140 | 9/1951 | Avery | 156—577 X |
| 2,636,691 | 4/1953 | Fritzinger | 156—577 X |
| 3,274,038 | 9/1966 | Karn | 156—577 X |
| 3,512,228 | 5/1970 | Carvell | 206—58 X |

HAROLD ANSHER, Primary Examiner

U.S. Cl. X.R.

156—579, 581; 206—52 R, 58, 59 R